United States Patent [19]

Zimmermann et al.

[11] 4,296,210

[45] Oct. 20, 1981

[54] OPEN-CELL SHAPED ARTICLE MADE OF ACETALIZED POLYVINYL ALCOHOL AND PROCESS FOR ITS MANUFACTURE

[75] Inventors: Wolfgang Zimmermann, Kelkheim; Hermann Schindler, Hofheim am Taunus; Günther Pospich, Frankfurt am Main, all of Fed. Rep. of Germany

[73] Assignee: Hoechst Aktiengesellschaft, Frankfurt am Main, Fed. Rep. of Germany

[21] Appl. No.: 211,332

[22] Filed: Nov. 26, 1980

[30] Foreign Application Priority Data

Dec. 1, 1979 [DE] Fed. Rep. of Germany ....... 2948508

[51] Int. Cl.$^3$ .............................................. C08V 9/30
[52] U.S. Cl. ...................................... 521/85; 521/65; 521/107; 521/141
[58] Field of Search .................... 521/85, 141, 65, 107

[56] References Cited

U.S. PATENT DOCUMENTS

| | | | |
|---|---|---|---|
| 2,609,347 | 9/1952 | Wilson | 521/141 |
| 2,653,917 | 9/1953 | Hammon | 521/141 |
| 2,846,407 | 8/1958 | Wilson | 521/141 |
| 3,492,250 | 1/1970 | Deyrup | 521/85 |

Primary Examiner—Morton Foelak
Attorney, Agent, or Firm—Curtis, Morris & Safford

[57] ABSTRACT

The acetalization of polyvinyl alcohol in an acidic aqueous medium in the presence of a wetting agent yields an open-cell, solid foam when the reaction medium contains gas bubbles which are preferably produced by stirring air into the reaction mixture. By carrying out the acetalization in the presence of a nucleic acid a porous shaped article is obtained in which the cells are uniformly distributed. The dried shaped article absorbs a multiple of its weight of water. It can be used for household and industrial purposes.

9 Claims, No Drawings

OPEN-CELL SHAPED ARTICLE MADE OF ACETALIZED POLYVINYL ALCOHOL AND PROCESS FOR ITS MANUFACTURE

This invention relates to a shaped article made of acetalized polyvinyl alcohols and to a process for its manufacture.

The manufacture of foam material with open cells by reaction of polyvinyl alcohol with formaldehyde in an aqueous medium has been known for a long time (cf. U.S. Pat. No. 2,609,347). The reaction is carried out at a temperature of from 20° to 60° C. in the presence of an acid catalyst, for example, sulfuric acid, while gas bubbles being dispersed in the reaction mixture. The gas bubbles are produced by beating air into the reaction mixture. Wetting agents are additionally used in order to ensure the formation of bubbles of uniform size and a better distribution of the bubbles in the mixture. In addition, the wetting agent serves to stabilize the sponge formed. The apparent specific gravity of the sponge obtained in this manner is in the range of from 0.03 to 0.15, preferably 0.05 to 0.06.

The said process has the disadvantage that—above all when it is carried out on an industrial scale—pores of varying size are formed which are non uniformly distributed in the mixture as in the course of the acetalization reaction the bubbles cannot be prevented completely from rising in the reaction mixture, the homogeneity of the pore distribution becoming impaired. Consequently, the mass obtained tends to shrink whereby the absorptivity and water retentivity of the sponge is reduced. In an industrial manufacturing process this volume contraction is combined with an increase in waste and cuttings. Moreover, the known process requires a long reaction time, i.e. 54 hours at a temperature of 30° C., so that it is uneconomical.

It is the object of the present invention to provide a sponge-like, porous shaped article on the basis of acetalized polyvinyl alcohol in which intercommunicating cells having a uniform a size as possible are distributed as uniformly as possible and which can be manufactured on an industrial scale in economic manner.

The invention therefore provides an open-cell shaped article made of acetalized polyvinyl alcohol which is characterized in that the shaped article (a) consists of acetalized polyvinyl alcohol which, prior to acetalization, has an ester number of 50 to 270 mg of KOH/g and the 4% by weight aqueous solution of which has a viscosity of 4 to 50 mPa.s at 20° C., (b) has cells with diameters in the range of from 0.5 to 5 mm in uniform distribution and (c) contains a nucleic acid.

The invention also provides a process for the manufacture of an open-cell shaped article made of acetalized polyvinyl alcohol by acetalization of polyvinyl alcohol in an acidic aqueous medium containing gas bubbles in the presence of a conventional wetting agent, which comprises acetalizing a polyvinyl alcohol having an ester number of 50 to 270 mg KOH/g the 4% by weight aqueous solution of which has a viscosity of 4 to 50 mPa.s at 20° C., in the presence of a nucleic acid in an amount sufficient to act as foam stabilizer.

As starting material for the manufacture of the shaped article according to the invention a partially saponified polyvinyl alcohol having an ester number of 50 to 270 mg KOH/g, preferably 100 to 200 mg KOH/g, is used. The 4% by weight aqueous solution of the polyvinyl alcohol has a viscosity of 4 to 50 mPa.s, preferably 10 to 26 mPa.s, measured at 20° C. according to DIN 53,015. During the acetalization reaction the polyvinyl alcohol has the form of a froth. For acetalization of the polyvinyl alcohol an aliphatic aldehyde or dialdehyde having from 1 to 4 carbon atoms is used. The use of formaldehyde or paraformaldehyde is preferred. The aldehyde is preferably used in the form of an aqueous solution. The acetalization is carried out in an acidic aqueous medium. A strong mineral acid, preferably sulfuric acid, is used as catalyst which is advantageously employed in the form of an aqueous solution having an acid content in the range of from 30 to 80% by weight, preferably 35 to 65% by weight.

The polyvinyl alcohol is acetalized in the presence of a conventional wetting agent, preferably an anionically effective wetting agent. Suitable wetting agents are, in particular, alkali metal salts, preferably sodium salts, of alkyl sulfonates, aryl sulfonates, alkylaryl sulfonates and of the corresponding sulfates, phosphates or phosphonates, for example, sodium lauryl sulfate, sodium dodecylbenzenesulfonate and sodium oleyl methyl tauride.

An essential feature of the shaped article according to the invention is the fact that it has cells having a diameter of 0.5 to 5 mm, preferably 0.5 to 3 mm and contains a nucleic acid. Preferably the nucleic acid content is in the range of from 0.2 to 2% by weight.

It is the characteristic feature of the process of the invention that the acetalization of the polyvinyl alcohol is carried out in the presence of nucleic acid in an amount sufficient to stabilize the foam. The nucleic acid is preferably used in an amount of from 0.5 to 5% by weight, more preferably 1 to 3% by weight, calculated on the total amount of polyvinyl alcohol and nucleic acid. Suitable nucleic acids are ribonucleic acids (RNS) as well as desoxyribonucleic acids (DNS) or mixtures thereof. It is recommended for economical reasons to use, instead of isolated nucleic acids, extracts containing nucleic acids, for example as obtained in the production of microbial bio-proteins. Extracts of this type have a content of nucleic acid of 40 to 80% by weight, preferably 50 to 60% by weight. Suitable starting materials are micro-organisms, for example bacteria such as *Methylomonas clara* ATCC 31226 and yeasts such as *Candida lipolytica* ATCC 20383 which may be obtained by cultivation on paraffins in the presence of an aqueous nutrient medium. The extracts can be obtained in known manner by extraction of a purified microbial cell mass with water at a temperature of from 30° to 95° C., preferably 40° to 70° C. (cf. German Auslegeschrift No. 2,633,666). According to the invention, this extract is preferably used in the form of an aqueous solution or dispersion containing 1 to 5% by weight, preferably 2 to 4% by weight, of extract.

In the manufacturing process of the invention the nucleic acid serves as foam stabilizer. Part of the nucleic acid, preferably 25 to 35% by weight of the amount used, remains in chemically bound form in the final shaped article and acts therein as internal plasticizer. The amount of chemically bound nucleic acid in the shaped article is determined by analysis of the phosphorus content.

To carry out the process of the invention it proved advantageous first to prepare a froth from an aqueous solution of the polyvinyl alcohol, the wetting agent and the nucleic acid by homogeneous distribution of an inert gas in the reaction mixture, preferably by beating in air at a stirring speed of 500 to 2,500 rpm, preferably 1,000 to 2,000 rpm. The volume of froth should be at most 50% of the final volume of the finished shaped article. After the "prefoaming", the aldehyde and the catalyst are added to the froth, the temperature of which should not exceed 40° C. Thereupon the mixture is allowed to stand in a closed mold at a temperature of from 65° to 100° C., preferably 70° to 90° C. Depending on the size of the mold, the reaction time is from 2 to 4 hours. The porous shaped article obtained without shrinking is then washed with water and dried until its weight remains constant, the drying temperature preferably being in the range of from 70° to 100° C.

The dried shaped article has open cells and a soft, velvety surface. It has an absorption capacity for water of 1,500 to 1,800% by weight (for comparison a natural sponge absorbs less than 1,000% by weight of water).

The open-cell shaped article according to the invention is suitable as sponge for industrial and household purposes, for example for washing cars and for bathing.

The following examples illustrate the invention, the percentages being by weight unless otherwise stated.

EXAMPLE 1

250 g of a 20% aqueous solution of polyvinyl alcohol, having an ester number of 140 mg of KOH/g, the 4% aqueous solution of which has a viscosity of 18 mPa.s, are poured into a beaker and, while stirring at 500 rpm with a rapid stirrer, a mixture of (a) 30 g of a 4% aqueous solution of sodium oleyl methyl tauride and (b) a suspension of 1.2 g of nucleic acid extract obtained from Methylomonas clara and containing 55% of nucleic acid, 5% of phosphorus and 15% of proteins in 58 g of water is added in portions. While beating in air at a stirring speed of 2,000 rpm, a froth having a volume of 0.5 l is prepared to which 60 g of a 30% aqueous formaldehyde solution and thereafter 65 g of a 60% aqueous sulfuric acid are added. During this operation the temperature of the mixture is maintained at about 35° C.

As soon as the froth has acquired a creamy consistency, it is poured in an acid-resistant 1 l mold which is closed by a cover. The mold is allowed to stand without movement for 4 hours at 75° C. Thereafter, the sponge obtained, the volume of which has not diminished with respect to the volume of the froth, is washed with water. After drying at 80° C., the sponge has intercommunicating cells having diameters of from 1 to 2 mm which are uniformly distributed. The dried sponge has a content of nucleic acid of 0.8%. It is elastic and absorbs 15 times it dry weight of water.

EXAMPLE 2

Example 1 is repeated with the following components: 250 g of polyvinyl alcohol solution (as defined in Example 1), 50 g of sodium oleyl methyl tauride solution (as defined in Example 1), 90 g of 2% suspension of the nucleic acid extract as defined in Example 1, 20 g of paraformaldehyde and 100 g of 60% sulfuric acid.

The dried sponge has intercommunicating cells having diameters of from 0.5 to 1 mm in uniform distribution. The nucleic acid content of the dried sponge is found to be 1%. The sponge is elastic and absorbs 16 times its dry weight of water.

EXAMPLE 3

Example 1 is repeated with the following components: 250 g of polyvinyl alcohol solution (as defined in Example 1), 50 g of sodium oleyl methyl tauride solution (as defined in Example 1), 100 g of 2% suspension of the nucleic acid extract as defined in Example 1, 20 g of paraformaldehyde, 100 g of 60% sulfuric acid and 1 g of pulverized cellulose (fiber length 0.5 mm).

The pulverized cellulose is added to the froth simultaneously with the paraformaldehyde.

The dried sponge obtained has intercommunicating cells having diameters of from 0.5 to 1 mm in uniform distribution and a content of nucleic acid of 1.4%. The sponge is elastic and absorbs 18 times its dry weight of water.

COMPARATIVE EXAMPLES 250 g of the polyvinyl alcohol solution as defined in Example 1 is given in a beaker and, while stirring at 500 rpm with a rapid stirrer, 30 g of the sodium oleyl methyl tauride solution as defined in Example 1 are added in portions. A preliminary froth is prepared from the mixture as described in Example 1.

(a) After transfer into a 1 liter mold as specified in Example 1 and heating to 75° C., a uniform sponge is not obtained, rather a gel-like liquid forms in which the cells become larger towards the surface.

(b) When the mixture which has been preliminary frothed is allowed to react for 24 hours at 35° C., an intensive shrinkage occurs and the cells in the sponge obtained increase in diameter from the bottom upward. Moreover, the sponge is not resilient and phosphorus cannot be detected therein.

What is claimed is:

1. An open-cell shaped article made of acetalized polyvinyl alcohol which is characterized in that the shaped article (a) consists of acetalized polyvinyl alcohol which, prior to acetalization, has an ester number of 50 to 270 mg of KOH/g and the 4% by weight aqueous solution of which has a viscosity of 4 to 50 mPa·s at 20° C., (b) has cells with diameters in the range of from 0.5 to 5 mm in uniform distribution and (c) contains a nucleic acid.

2. The shaped article of claim 1, consisting of formalized polyvinyl alcohol.

3. The shaped article of claim 1, containing from 0.2 to 2% by weight of a nucleic acid.

4. A process for the manufacture of an open-cell shaped article made of acetalized polyvinyl alcohol by acetalization of polyvinyl alcohol in an acidic aqueous medium containing gas bubbles in the presence of a conventional wetting agent, which comprises acetalizing a polyvinyl alcohol having an ester number of 50 to 270 mg KOH/g, the 4% by weight aqueous solution of which has a viscosity of 4 to 40 mPa.s at 20° C., in the presence of a nucleic acid in an amount sufficient to act as foam stabilizer.

5. The process of claim 4, wherein the acetalization is carried out with an aliphatic aldehyde or dialdehyde.

6. The process of claim 5, wherein the aliphatic aldehyde is formaldehyde or paraformaldehyde.

7. The process of claim 4, wherein the nucleic acid is used in an amount of from 0.5 to 5% by weight, calculated on the total amount of polyvinyl alcohol and nucleic acid.

8. The process of claim 4, wherein the acetalization is carried out at a temperature of from 65° to 100° C.

9. The process of claim 4, wherein the acetalization is carried out while homogeneously distributing a inert gas in the reaction mixture.

* * * * *